United States Patent [19]

Kim

[11] Patent Number: 5,506,690
[45] Date of Patent: Apr. 9, 1996

[54] VIDEO ACCOMPANIMENT APPARATUS

[75] Inventor: Young-eun Kim, Suwon, Rep. of Korea

[73] Assignee: Samsung Electronics Co., Ltd., Kyungki-do, Rep. of Korea

[21] Appl. No.: 235,524

[22] Filed: Apr. 29, 1994

[30] Foreign Application Priority Data

Apr. 30, 1993 [KR] Rep. of Korea .................. 93-7170

[51] Int. Cl.⁶ .................................................. H04N 5/85
[52] U.S. Cl. .......................................... 358/342; 348/705
[58] Field of Search ................................. 358/335, 342; 348/705; H04N 5/85

[56] References Cited

U.S. PATENT DOCUMENTS 5,151,793  9/1992  Ito ................................. 358/335
5,245,600  9/1993  Yamauchi ....................... 358/343
5,247,126  9/1993  Okamura ........................ 358/335

*Primary Examiner*—Howard W. Britton
*Attorney, Agent, or Firm*—Sughrue, Mion, Zinn, Macpeak & Seas

[57] ABSTRACT

A video accompaniment apparatus provides various screens of high picture quality by using data recorded on a laser disk or a compact disk and data stored in a memory accompaniment apparatus in which a plurality of accompanied songs and song texts are recorded. The background screen for video display is provided by the optical disk apparatus or by an external video unit; the song text is provided by the memory accompaniment unit; the audio accompaniment is provided by the optical disk unit or the memory accompaniment unit or by an external audio unit; and the user's voice is combined with the audio accompaniment selected.

20 Claims, 2 Drawing Sheets

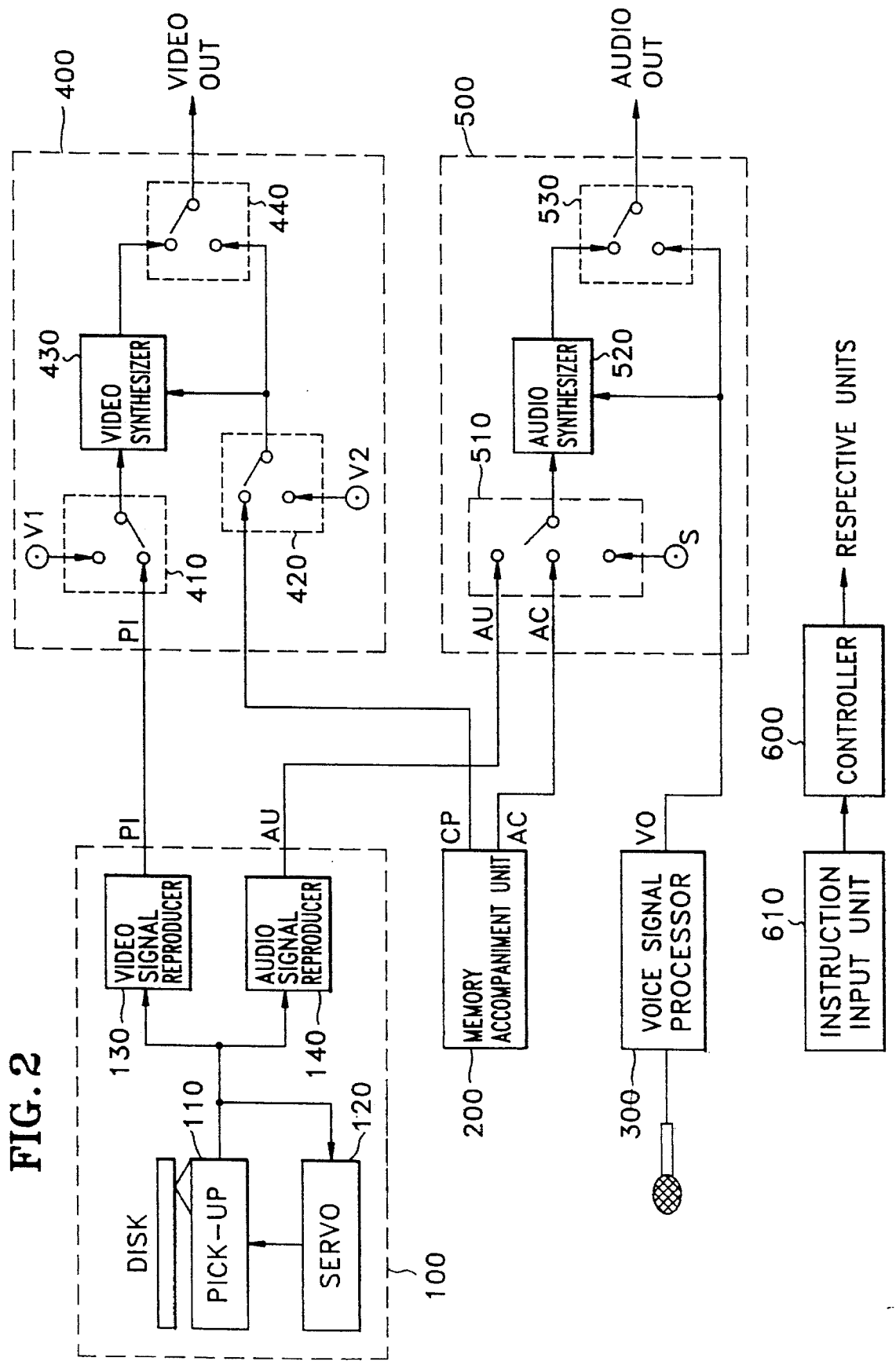

VIDEO ACCOMPANIMENT APPARATUS

BACKGROUND OF THE INVENTION

The present invention relates to a video accompaniment apparatus, and more particularly, to a video accompaniment apparatus which provides high-quality pictures and a variety of music, by integrally forming an optical disk on which video and audio information is recorded and a memory in which a great deal of accompaniment and song text information is stored.

In general, a video accompaniment apparatus is connected with a video monitor and audio amplifier, to display the song text information while a song accompaniment is performed. Several types of video accompaniment systems are known, and these include, a laser disk video accompaniment apparatus using a laser disk player (LDP), a compact disk video accompaniment apparatus using a compact disk graphic player (CDGP), and a memory accompaniment apparatus using a memory.

Among the various types, the laser disk video accompaniment apparatus is the best in terms of picture quality and sound quality. However, the number of songs recordable on a single laser disk is restricted to only 20 songs or less and the song search time is long.

A compact disk video accompaniment apparatus has a sound quality as good as that of a laser disk video accompaniment apparatus. However, since a compact disk video accompaniment apparatus can only record a restricted number of still pictures on the sub-code channel of the compact disk, compared with a laser disk, the coupling characteristic between pictures and music is lowered and the number of songs recordable on a single compact disk is limited to only about 15 songs.

In a "Karaoke" compact disk video accompaniment apparatus, as disclosed in U.S. Pat. No. 5,151,793, the video signal demodulated from the optical disk, on which video and audio information is recorded, and the video signal output from an external signal source, e.g., a camcorder, are superimposed, and graphic data corresponding to the song text demodulated from the optical disk is imposed onto the superimposed video.

A memory accompaniment apparatus cannot offer sound quality as good as that provided by a laser disk video accompaniment apparatus or a compact disk video accompaniment apparatus but can offer accompaniment and song text information for about 1,000–1,500 songs. Also, a memory accompaniment apparatus can search for a song at high speeds.

FIG. 1 shows a memory accompaniment apparatus which provides an accompaniment signal and a caption signal corresponding to the song texts and which is connected with a conventional video monitor and an audio amplifier. A controller 12 for controlling the operation of the apparatus according to a control instruction is connected to the output terminal of an instruction input unit 11 which supplies instructions to the memory accompaniment apparatus. An accompaniment signal generator 13 for generating an accompaniment signal and a caption signal generator 14 for generating a caption signal are connected to the output terminal of the controller 12. An audio synthesizer 16 for synthesizing an accompaniment signal and a voice signal and supplying the synthesized signals to an audio amplifier is connected to the output terminals of the accompaniment signal generator 13 and a voice signal processor 15. The voice signal processor 15, which provides a voice signal to the synthesizer 16, recieves a voice signal via a microphone and processes the voice signal before passing it along to the synthesizer 16. The accompaniment signal generator 13 includes a memory for storing accompaniment information, and the caption signal generator 14 includes a memory for storing song text information.

The operation of the memory accompaniment apparatus having the configuration as shown in FIG. 1 will be briefly described. If a specific song is selected by the instruction input unit 11 and an accompaniment starting instruction is applied to the controller 12, the controller 12 controls the accompaniment signal generator 13 to cause it to generate an accompaniment signal for the song selected. Simultaneously, the controller 12 controls the caption signal generator 14 to cause it to generate a caption signal for the song selected. The output of the caption signal generator 14 is supplied to an external video monitor.

The voice signal output from the voice signal processor 15 is synthesized with the accompaniment signal in the audio synthesizer 16. The voice signal processor 15 processes the voice signal supplied thereto via the microphone. That is to say, the voice signal processor 15 regulates the echo, tone, speed, etc. of the voice signal. The voice signal processed in the voice signal processor is synthesized with the accompaniment signal output from the accompaniment signal generator 13 in the audio synthesizer 16, and the synthesized signal is supplied to an audio amplifier or the like.

Since the memory accompaniment apparatus described stores a lot of songs but does not store video information apart from the caption, the caption corresponding to the song texts should be displayed on the screen of a video monitor or should be superimposed onto a video signal supplied from an external video signal input source.

If a memory accompaniment apparatus, such as shown in FIG. 1, or a conventional video accompaniment apparatus using an optical disk is used independently, the user cannot avoid the drawbacks of each apparatus. If the optical disk player and the aforementioned memory accompaniment apparatus are integrally formed, convenience to the user can be greatly improved by compensating for the respective drawbacks of each type of video accompaniment apparatus.

SUMMARY OF THE INVENTION

Therefore, to solve the aforementioned problems, an object of the present invention is to provide a video accompaniment apparatus which is integrally formed of an optical disk player providing high quality picture and sound and a memory accompaniment apparatus providing a rapid search and a large selection of songs.

To accomplish the above object, there is provided: an optical disk reproducing apparatus, including an optical disk reproducing signal processor for reproducing and outputting video and audio signals by reading information recorded on an optical disk, and a video accompaniment apparatus. The video accompaniment apparatus according to the present invention includes:

a memory accompaniment unit for outputting an accompaniment-purpose caption signal and an audio accompaniment signal by reading the song text and accompaniment information for a given song selected from among plural songs stored in a memory;

a video output unit for outputting a synthesized video signal by mixing the video signal output from the optical disk reproducing signal processor and the accompaniment-purpose caption signal output from the memory accompaniment unit; and an audio output unit for outputting a synthesized audio signal formed by mixing the accompaniment signal output from the memory accompaniment unit with a user voice signal corresponding to a user's voice;

wherein the optical disk reproducing apparatus and the memory accompaniment unit are integrally formed.

BRIEF DESCRIPTION OF THE DRAWINGS

The above objects and other advantages of the present invention will become more apparent from the following description of a preferred embodiment thereof with reference to the attached drawings in which:

FIG. 2 is a block diagram showing an embodiment of the video accompaniment apparatus according to the present invention.

DETAILED DESCRIPTION OF THE INVENTION

Figure 1:
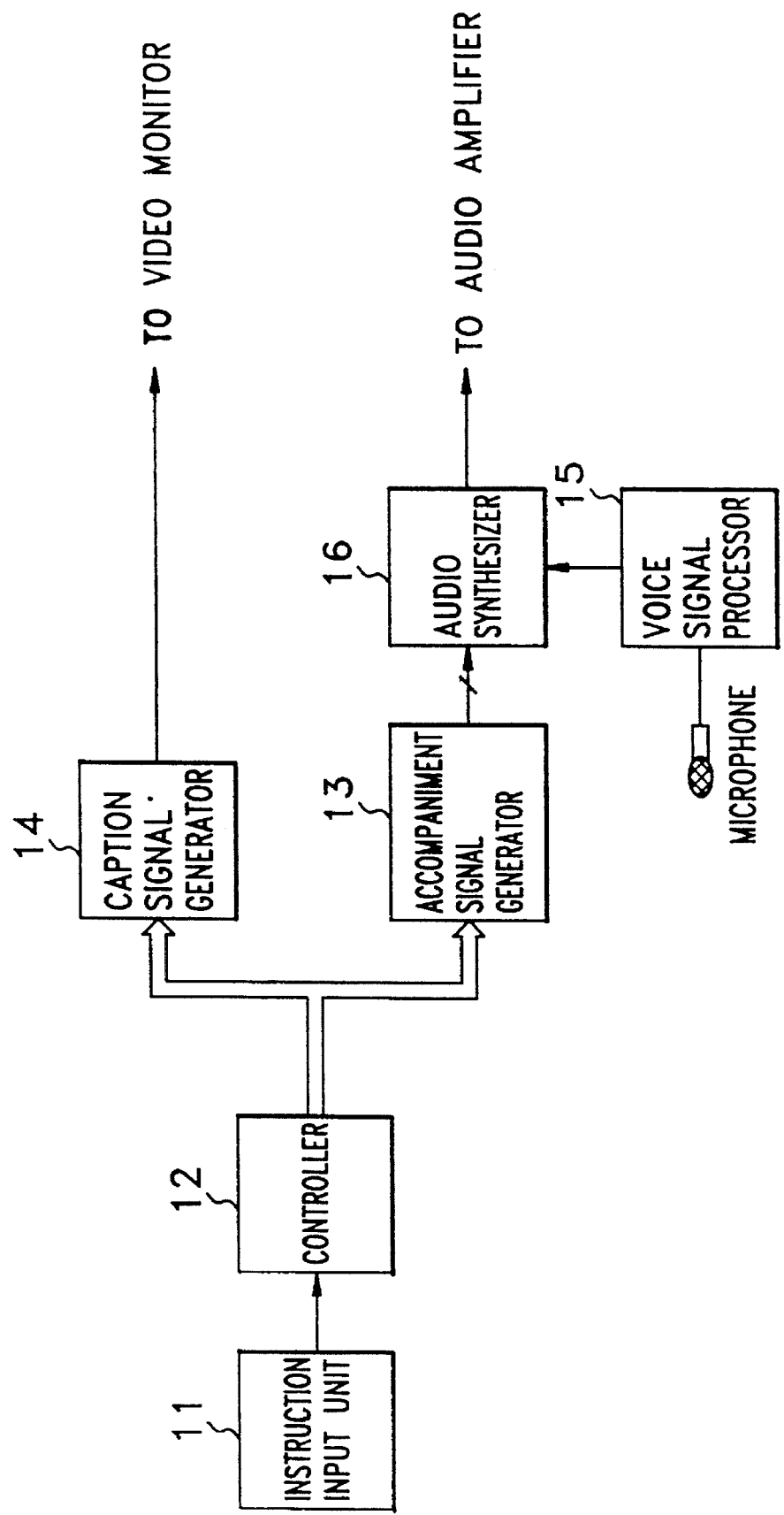
FIG. 1 is a block diagram of a conventional memory accompaniment apparatus.

The apparatus shown in FIG. 2 consists of: an optical disk reproducing signal processor 100 for outputting a video signal PI and an audio signal AU by reading the information recorded on an optical disk, a memory accompaniment unit 200 for outputting an accompaniment-purpose caption signal CP and an accompaniment signal AC stored in a memory, a voice signal processor 300 for processing and outputting therefrom a user voice signal corresponding to a user's voice, a video output unit 400 for outputting a video signal, an audio output unit 500 for outputting an audio signal, a controller 600 for controlling the respective units 100 to 500, and an instruction input unit 610 for delivering instructions to the controller 600.

The optical disk reproducing signal processor 100 includes a pick-up 110 for picking up the signal recorded on the optical disk, a servo 120, a video signal reproducer 130 and an audio signal reproducer 140. The output terminal of the pick-up 110 is connected to the respective input terminals of the servo 120, the video signal reproducer 130 and audio signal reproducer 140. The control terminal of the pick-up 110 is connected with the output terminal of the servo 120.

The video output unit 400 includes a first selector 410, a second selector 420, a video synthesizer 430 and a third selector 440. A first selectable input terminal of first selector 410 is connected to the output terminal of the video signal reproducer 130, a second selectable input terminal of first selector 410 is connected to a first external video source input terminal V1, and an output terminal of first selector 410 is connected to a first input terminal of the video synthesizer 430. A first selectable input terminal of second selector 420 is connected to the caption signal output terminal of the memory accompaniment unit 200, a second selectable input terminal is connected to a second external video source input terminal V2, and the output terminal of second selector 420 is connected to a second input terminal of the video synthesizer 430 as well as to an input of the third selector 440. As such, the first input terminal of the video synthesizer 430 is connected to the output terminal of the first selector 410, and the second input terminal is connected to the output terminal of the second selector 420. A first selectable input terminal of third selector 440 is connected to the output terminal of the video synthesizer 430, and a second selectable input terminal of third selector 440 is connected to the output terminal of second selector 420.

Also, the audio output unit 500 includes a fourth selector 510, an audio synthesizer 520 and a fifth selector 530. A first selectable input terminal of fourth selector 510 is connected to the output terminal of the audio signal reproducer 140, a second selectable input terminal of fourth selector 510 is connected to the accompaniment signal output terminal of the memory accompaniment unit 200, and a third selectable input terminal of fourth selector 510 is connected to an external audio source input terminal S. A first input terminal of the audio synthesizer 520 is connected to the output terminal of the fourth selector 510, and a second input terminal of audio synthesizer 520 is connected to the output terminal of the voice signal processor 300. A first selectable input terminal of the fifth selector 530 is connected to the output terminal of the audio synthesizer 520, and a second selectable input terminal of fifth selector 530 is connected to the output terminal of the voice signal processor 300.

An input terminal of the controller 600 is connected to an output terminal of the instruction input unit 610 having input keys mounted either in a remote control or set therein, or both.

The operation of the video accompaniment apparatus having the configuration as shown in FIG. 2 will now be described.

The video accompaniment apparatus according to the present invention is designed to perform all of the general functions of an optical disk player and a conventional video accompaniment apparatus. In other words, when the functions of an optical disk player are performed, the adjustments of the elements for normal/select/random reproduction mode selection are all performed. Also, when the functions of a conventional video accompaniment apparatus are performed, the adjustment of song selection, tone and speed is also performed.

First, a video signal processing operation with respect to the background screen and caption will be described.

If information on the optical disk is to be reproduced, the controller 600 controls the conventionally identified operations of the servo 120 and the pick-up 110 to cause the pick up to read digital signals recorded on the optical disk, process the signals digitally, modulate the signals into high-frequency signals, and then output the signals to the video signal reproducer 130 and the audio signal reproducer 140, respectively. The detailed configuration and operation of an optical disk reproducing signal processor which reproduces video and audio signals recorded on an optical disk are disclosed in U.S. Pat. No. 5,151,793.

The video signal reproducer 130 band filters the output signals of the pick up 110 with respect to the band of the video signal, amplifies and demodulates the video signal, and supplies the video signal PI to the video synthesizer 430 as an input thereto, via the first selectable input terminal of the first selector 410.

The memory accompaniment unit 200 supplies the caption signal CP, which is the song text information, to the video synthesizer 430 via the first selectable input terminal of the second selector 420.

The video synthesizer 430, to which a background screen signal output from video signal reproducer 130 and a caption signal output from memory accompaniment unit 200 are input, outputs a superimposed video signal whereby the caption signal is displayed as the song text on the background screen. If the instruction for the video signal which a user desires to use as the background screen is input to the controller 600 through the instruction input unit 610, the controller 600 recognizes the instruction and outputs a select control signal to the first selector 410.

The first selector 410 selectively outputs either the video signal PI output from the video signal reproducer 130 or a video signal input from the external video signal source through the first external video source input terminal V1, as the background screen to the video synthesizer 430 under the control of the controller 600. Here, a video cassette recorder (VCR), television or camcorder can be used as the external video signal source.

Where the optical disk is a laser disk, the caption signal input to the video synthesizer 430 may be a caption signal CP output from the memory accompaniment unit 200 or an external caption signal input through the second external video source input terminal V2. The selection of the caption signal is under control of the controller 600, which responds to instructions from instruction input unit 610 and controls the second selector 420.

The second selector 420 selectively outputs the caption signal input to either the first and or the second select input terminal thereof to the video synthesizer 430 under the control of the controller 600. In the case where the optical disk is a compact disk graphic (CD-G) recording, the caption signal recorded in the subcode area on the optical disk is selected to be the input to the video synthesizer 430.

As a modified example, the instruction codes which can select the video signal CP with respect to each song of the memory accompaniment unit 200, are input as A, B, C, . . . Z and a variety of different video signals (captions) of A, B, C, . . . Z types are recorded in the laser disk, thereby enabling the video caption for the selected song among the songs stored in the memory accompaniment unit 200 to be reproduced.

Also, while the songs recorded in the memory accompaniment unit 200 are reproduced, the content of the background screen is set according to the desired select/random/continuous reproduction mode by means of the instruction input unit 610 in case the video recorded on a laser disk is used as the background screen.

The third selector 440 selectively outputs the video signal and caption signal synthesized in the video synthesizer 430 or the caption signal under the control of the controller 600.

Next, the processing operation of the audio signal used as the accompaniment signal will be described.

The audio signal reproducer 140 of the optical disk reproducing signal processor 100 operates to band-filter the output signal of the pick-up 110 with respect to the audio signal band, amplify and demodulate the filtered signal, and supply the audio signal AU to the audio synthesizer 520 as an input signal via the first selectable input terminal of the fourth selector 510.

The memory accompaniment unit 200 supplies the accompaniment signal AC to the audio synthesizer 520 through the second selectable input terminal of the fourth selector 510. The memory accompaniment unit 200 has the configuration and performs the operations of the caption signal generator 14 and the accompaniment signal generator 13 as shown and described with reference to FIG. 1.

The accompaniment signals are the audio signal AU from the optical disk reproducing signal processor 100, the accompaniment signal AC from the memory accompaniment unit 200, or an external accompaniment signal input from an external audio signal source through the external audio input terminal S. If an instruction for the signal which a user desires to use as the accompaniment signal is input to the controller 600 through the instruction input unit 610, the controller 600 recognizes the instruction and outputs a select control signal to the fourth selector 510. The fourth selector 510 selectively supplies one of the accompaniment signals to the audio synthesizer 520 under the control of the controller 600. The external audio source which supplies an accompaniment signal to the input terminal S can be an audio signal from a television, a radio, or a musical instrument. The audio synthesizer 520 outputs an audio signal by mixing the selected accompaniment signal with a signal representing a user's voice.

The fifth selector 530 selectively outputs either the synthesized audio signal output from the audio synthesizer 520 or the voice signal V0 output from the voice signal processor 300 in accordance with the select control signal output from the controller 600.

As described above, in integrally forming an optical disk player and a memory accompaniment apparatus, the video accompaniment apparatus according to the present invention selects and uses the video signal from the optical disk player or the video signal provided from an external signal source as the background screen, and uses the caption signal from the memory accompaniment unit or from an external source as the text of the song, thereby providing various background screens on which the song text appears. The accompaniment signal (i.e. the music) from the optical disk player, from the memory accompaniment unit or from an external signal source is provided at an audio output. As a result there is provided a video accompaniment apparatus which has high quality video and audio, a large selection of video text, and rapid search capability for songs.

What is claimed is:

1. A video accompaniment apparatus of the type which adds a user's voice signals to audio accompaniment signals and supplies the same to an audio reproduction device, and which combines song text information with video background information and supplies the same to a video reproduction device, said video accompaniment apparatus comprising:

an optical disk reproducing signal processing unit means for reproducing and outputting a video signal and an audio signal by reading information recorded on an optical disk;

a memory accompaniment unit means, having song text information and audio accompaniment information stored therein for a plurality of songs, for selectively supplying at an output thereof song text information signals and audio accompaniment signals corresponding to a selected song under control of a selection control signal supplied thereto;

a video output unit means for generating a synthesized video signal by mixing the video signal output from said optical disk reproducing signal processing unit means with the song text information signals from said memory accompaniment unit means;

an audio output unit means for generating a synthesized audio signal by mixing user voice signals corresponding to a user's voice with either the audio accompaniment signals from said memory accompaniment unit means or the audio signal from said optical disk reproducing signal processing unit means; and a control selection means for selecting a song and a video signal and an audio signal corresponding to the selected song from said optical disk reproducing signal processing unit means and for selecting song text information signals and audio accompaniment signals corresponding to the selected song from said memory accompaniment unit means.

2. A video accompaniment apparatus as claimed in claim 1, wherein said optical disk reproducing signal processing unit means and said memory accompaniment unit means are integrally formed.

3. A video accompaniment apparatus as claimed in claim 1, further comprising a voice signal processing unit means responsive to a user's voice for outputting the user voice signals to said audio output unit means.

4. A video accompaniment apparatus as claimed in claim 3, wherein said video output unit means comprises:

a video synthesizer means, to which the video signal and the song text information signals are input, for superimposing the video signal and song text information signals applied thereto and outputting the superimposed signals as the synthesized video signal to an output;

a first selector means for selectively outputting to said video synthesizer either the video signal output from said optical disk reproducing signal processing unit means or an external video signal provided through an external input terminal; and a second selector means for selectively outputting to said video synthesizer means one of the following:
the song text information signals from said memory accompaniment unit means,
song text information signals recorded in a subcode area on said optical disk and reproduced by said optical disk reproducing signal processing unit means, or
song text information signals provided through an external input terminal to said second selector means.

5. A video accompaniment apparatus as claimed in claim 4, wherein said video output unit means further comprises a third selector means for selectively outputting to said video reproduction device either the synthesized video signal output from said video synthesizer means or the song text information signals output from said second selector means.

6. A video accompaniment apparatus as claimed in claim 5, wherein said audio output unit means comprises:

a fourth selector means for selectively outputting one of the following as a selected audio signal:
the audio signal output from said optical disk reproducing signal processing unit means,
the audio accompaniment signals output from said memory accompaniment unit means, or
an external audio accompaniment signal provided through an external input terminal to said fourth selector means; and an audio synthesizer means for outputting a synthesized audio signal by synthesizing the selected audio signal. output by said fourth selector means and the user voice signals output from said voice signal processing unit means.

7. A video accompaniment apparatus as claimed in claim 6, wherein said audio output unit means further comprises a fifth selector means for selectively outputting to said audio reproduction device either the synthesized audio signal output from said audio synthesizer means or the user voice signals output from said voice signal processing unit means.

8. A video accompaniment apparatus as claimed in claim 7, wherein said control selection means further comprises means for controlling said first through said fifth selector means to determine the selection of signals output to said video and audio reproduction devices.

9. A video accompaniment apparatus as claimed in claim 3, wherein said video output unit means comprises:

a video synthesizer means, to which the video signal and the song text information signals are input, for superimposing the video signal and the song text information signals applied thereto and outputting the superimposed signals as the synthesized video signal to an output;

a first selector means for selectively outputting to said video synthesizer either the video signal output from said optical disk reproducing signal processing unit means or an external video signal provided through an external input terminal; and a second selector means for selectively outputting to said video synthesizer means either the song text information signals provided by said memory accompaniment unit means or an external song text information signal provided through an external input terminal.

10. A video accompaniment apparatus as claimed in claim 9, wherein said audio output unit means comprises:

a fourth selector means for selectively outputting one of the following as a selected audio signal:
the audio signal output from said optical disk reproducing signal processing unit means,
the audio accompaniment signals output from said memory accompaniment unit means, or
an external audio accompaniment signal provided through an external input terminal to said fourth selector means; and an audio synthesizer means for outputting a synthesized audio signal by synthesizing the selected audio signal output by said fourth selector means and the user voice signals output from said voice signal processing unit means.

11. A video accompaniment apparatus as claimed in claim 10, wherein said audio output unit means further comprises a fifth selector means for selectively outputting to said audio reproduction device either the synthesized audio signal output from said audio synthesizer means or the user voice signals output from said voice signal processing unit means.

12. A video accompaniment apparatus as claimed in claim 11, wherein said control selection means further comprises means for controlling said first, second, fourth and fifth selector means to determine the selection of signals output to said video and audio reproduction devices.

13. A video accompaniment apparatus as claimed in claim 9, wherein said video output unit means further comprises a third selector means for selectively outputting to said video reproduction device either the synthesized video signal output from said video synthesizer means or the song text information signals output from said second selector means.

14. A video accompaniment apparatus as claimed in claim 13, wherein said audio output unit means comprises:

a fourth selector means for selectively outputting one of the following as a selected audio signal:
the audio signal output from said optical disk reproducing signal processing unit means,
the audio accompaniment signals output from said memory accompaniment unit means, or
an external audio accompaniment signal provided through an external input terminal to said fourth selector means; and an audio synthesizer means for outputting a synthesized audio signal by synthesizing the selected audio signal output by said fourth selector means and the user voice signals output from said voice signal processing unit means.

15. A video accompaniment apparatus as claimed in claim 14, wherein said audio output unit means further comprises a fifth selector means for selectively outputting to said audio reproduction device either the synthesized audio signal output from said audio synthesizer means or the user voice signals output from said voice signal processing unit means.

16. A video accompaniment apparatus as claimed in claim 15, wherein said control selection means further comprises means for controlling said first through said fifth selector means to determine the selection of signals output to said video and audio reproduction devices.

17. An audiovisual accompaniment apparatus, comprising:

an optical disk reproducing device configured to read information, stored on an optical disk and corresponding to a selected title, and output the information read as a video information signal through a first channel and an audio information signal through a second channel;

a memory accompaniment unit configured to store information corresponding to the selected title and output the stored information as a caption signal through a third channel and an accompaniment signal through a fourth channel;

a video output unit comprising video inputs for said first channel and said third channel and a video synthesizer connected to said video inputs, said video synthesizer combining video signals received at said video inputs into a composite video output signal;

an acoustic sound processor configured to receive and process acoustic information and output the acoustic information as transduced signals through a fifth channel; and an audio output unit comprising audio inputs for said second and said fourth channels, a further input for said fifth channel, and an audio synthesizer connected to said audio inputs and said further input, said audio synthesizer combining audio signals received at said audio inputs with the transduced signals received at said further input into a composite audio output signal.

18. The apparatus according to claim 17, wherein:

said video input for said first channel comprises a switch for either blocking or passing the video information signal, said switch being actuated by a first switch signal;

said video input for said third channel comprises a switch for either blocking or passing the caption signal, said switch being actuated by a second switch signal;

said audio input for said second channel comprises a switch for either blocking or passing the audio information signal, said switch being actuated by a third switch signal;

said audio input for said fourth channel comprises a switch for either blocking or passing the accompaniment signal, said switch being actuated by a fourth switch signal; and said apparatus further comprising:

a controller for outputting, selectively, any of the first, second, third and fourth switch signals in accordance with selection commands input into said controller.

19. A method comprising the steps of:

reading a video signal corresponding to a particular selection from an optical disk reader;

reading an audio signal corresponding to the selection from the optical disk reader;

reading a caption signal corresponding to the selection from a caption signal generator;

reading an accompaniment signal corresponding to the selection from an accompaniment signal generator;

transducing an acoustic signal performed in conjunction with the selection;

synthesizing the video signal and the caption signal into a composite video output signal;

selecting either the audio signal or the accompaniment signal to provide a selected audio signal; and synthesizing the transduced signal and the selected audio signal into a composite audio output signal.

20. The method according to claim 19, further comprising the steps of:

reading a further caption signal corresponding to the selection from the optical disk reader; and selecting either the caption signal or the further caption signal to provide a selected caption signal; and wherein said first synthesizing step synthesizes the video signal and the selected caption signal into a composite video output signal.

* * * * *